UNITED STATES PATENT OFFICE.

JACOB H. SMYSER, OF PITTSBURGH, PENNSYLVANIA.

IMPROVEMENT IN DISINTEGRATING WASTE VULCANIZED RUBBER.

Specification forming part of Letters Patent No. 122,289, dated December 26, 1871.

*To all whom it may concern:*

Be it known that I, JACOB H. SMYSER, of Pittsburgh, in the county of Allegheny and State of Pennsylvania, have invented certain new and useful Improvements in Comminuting Vulcanized Caoutchouc or India Rubber, and that the following is a full, clear, and exact description of the same.

Waste vulcanized rubber which is to be re-used generally comes in the form of worn-out car-springs, and many plans have been devised for reducing this waste rubber to a comminuted state or condition, so that it may be treated with other mixtures or compounds. It has been cut into fine shreds, torn into small pieces by spiked or spurred cylinders, crushed between rollers, and probably otherwise reduced, but at great expense, and only partially accomplished. My invention consists in comminuting waste vulcanized India rubber or caoutchouc by subjecting it to the abrading action of substances of granular texture, such as grindstones, burr-stones, emery-wheels or belts, or other substances having abrading properties.

To enable others skilled in the art to make and use my invention, I will proceed to describe the same.

Worn-out car-springs, in which form the most of the waste rubber is now found, possess great density and tenacity, and can only be approximately reduced by the methods heretofore practiced, and the particles are so compressed by the hitherto methods that they are very difficult to be put in solution. By subjecting this waste rubber to the direct grinding action of burr or other grinding stones, emery, sand, or glass belts or wheels in motion, it can be reduced to a fine powder and with great economy, and the powder is in such a comminuted state that it goes into solution readily with treatment by suitable chemicals or appliances.

Sheets of rubber have been roughened for the reception of flock or other coating by bringing them in contact with emery or sand paper surfaces; but waste rubber had never been reduced to a powdered or fine condition for reutilization by grinding or abrading surfaces prior to my invention.

Having thus fully described my invention, what I claim is—

Comminuting waste vulcanized India rubber or caoutchouc by subjecting it to the abrading action of burr or grindstones, emery, sand, or glass belts or wheels, substantially as and for the purpose described.

JACOB H. SMYSER.

Witnesses:
J. H. SWETT,
H. D. ROLFE.

(84)